(12) United States Patent
Ohnishi

(10) Patent No.: US 7,172,726 B2
(45) Date of Patent: Feb. 6, 2007

(54) LEAD-FREE SOLDER

(75) Inventor: Tsukasa Ohnishi, Tokyo (JP)

(73) Assignee: Senju Metal Industry Co., Ltd., Tokyo (JP)

( * ) Notice: Subject to any disclaimer, the term of this patent is extended or adjusted under 35 U.S.C. 154(b) by 0 days.

(21) Appl. No.: 10/682,305

(22) Filed: Oct. 10, 2003

(65) Prior Publication Data

US 2004/0115088 A1    Jun. 17, 2004

(30) Foreign Application Priority Data

Oct. 15, 2002    (JP)    ............... 2002-300028

(51) Int. Cl.
C22C 13/00    (2006.01)
B23K 35/26    (2006.01)

(52) U.S. Cl. .................. 420/560; 420/561; 148/400

(58) Field of Classification Search ................ 148/400; 420/560–561
See application file for complete search history.

(56) References Cited

U.S. PATENT DOCUMENTS

2002/0127136 A1    9/2002    Takaoka et al ............. 420/557

FOREIGN PATENT DOCUMENTS

| EP | 1213089 | | 6/2002 |
| JP | 55020403 | * | 2/1980 |
| JP | 11216591 | * | 8/1999 |
| JP | 2001121286 | | 5/2001 |
| JP | 2001205476 | * | 7/2001 |
| JP | 2001334384 | | 12/2001 |

* cited by examiner

Primary Examiner—Sikyin Ip
(74) Attorney, Agent, or Firm—Michael Tobias

(57) ABSTRACT

A lead-free solder which is significantly less susceptible to copper leaching when used in a molten state in which coil ends of copper wire are dipped comprises 1.5–8 mass % of Cu, 0.01–2 mass % of Co, optionally 0.01–1 mass % of Ni, and a remainder of Sn and has a liquidus temperature of 420° C. or below. The solder may further comprise at least one oxidation-inhibiting element selected from the group consisting of P, Ge, and Ga in a total amount of 0.001–0.5 mass %, and/or Ag in an amount of 0.05–2 mass % as a wettability-improving element.

11 Claims, No Drawings

LEAD-FREE SOLDER

BACKGROUND OF THE INVENTION

1. Field of the Invention

The present invention relates to a lead-free solder which is classified as a high-temperature solder and in particular to a lead-free, Sn-based solder suitable for use in soldering and precoating coil ends.

2. Description of the Related Art

Various coils are used in electronic equipment such as computers. For example, coils are incorporated into transformers or into motors for disc drives or cooling fans of electronic equipment. These coils are usually soldered at their ends to electric terminals to form electrical connections.

Normally coils are formed from copper wire covered with an insulating coating which typically consists of an inner enamel coat and an outer polyurethane resin coat. Therefore, in order to solder a coil at its ends to electrical terminals, it is necessary to remove both the inner enamel coat and the outer polyurethane coat (the two coats being hereinafter referred to collectively as insulating coats) from the copper wire at the coil ends. It is conceivable to remove the insulating coats at the coil ends by a mechanical method using a tool such as a knife, but such mechanical removal is slow, thus adversely affecting the operating efficiency of soldering. Therefore, removal of the insulating coats at coil ends is usually performed by a thermal method in which the insulating coats are melted away. More specifically, the insulating coats at coil ends are thermally removed by dipping the coil ends in molten solder at a temperature sufficient to melt the coats away (in the vicinity of 400° C.).

Soldering of coil ends is preferably preceded by precoating of the coil ends with solder in order to ensure that satisfactory soldered joints are formed. Such precoating is carried out by dipping the coil ends in molten solder.

Thus, the act of dipping the ends of a coil of coated copper wire in molten solder prior to soldering can perform two functions at the same time, i.e., removing the insulating coats from the wire at the coil ends and precoating the wire at the coil ends with solder.

Dipping of coil ends in molten solder is usually conducted after a soldering flux has been applied to the coil ends. The heat of the molten solder causes the insulating coats to melt into the molten solder, and the flux applied to the surface of the coil ends floats on the molten solder around the coil ends. As a result, as the insulating coats of the coil ends are removed by the heat of the molten solder to expose the copper wire, the flux floating around the coil ends acts on the exposed copper wire so as to assist the molten solder in mechanically bonding to the copper wire.

The coil ends which have been precoated with solder in this manner are then soldered to electric terminals. In some cases, soldering can be performed using the precoated solder alone. When the precoated solder is not sufficient to form a satisfactory soldered joint, additional solder is used to solder the precoated coil ends to electric terminals. The additional solder may be the same as that used for precoating, or it may be a different lead-free solder, which is preferably solder with a lower melting point.

Some copper wires used to make coils in electronic equipment are as thin as 100 μm or smaller in diameter. When the ends of such thin copper wires are dipped in molten solder, so-called copper leaching may take place. Copper leaching is the phenomenon in which a thin copper wire which is dipped in molten solder dissolves in the molten solder, thereby causing the wire to become appreciably thinner or completely disappear. Copper leaching may also occur during soldering of coil ends, particularly during dip soldering. Countermeasures against such copper leaching of thin copper wires have been taken in the past.

The technique that has been used most widely in order to prevent copper leaching of a thin copper wire in molten solder is to add Cu to the solder. Since the amount of Cu which can dissolve in molten solder is limited, use of a solder to which Cu has been added makes it difficult for a copper wire to dissolve in molten solder when it is dipped in the molten solder. An example of such a solder is a Pb—Sn—Cu alloy, and a typical composition of such solder is a Pb-63Sn alloy to which Cu is added so as to have a Cu content of about 1.5% to 2%. The Pb—Sn—Cu solder has good solderability with respect to copper wires, so it has been widely used in precoating of coil ends.

However, because of the toxic nature of lead (Pb), which may result in lead poisoning when lead-containing waste is disposed of in a landfill and acid rain dissolves lead from the waste and contaminates underground water with lead, there is a need for a lead-free solder for use in precoating and soldering of coil ends.

Lead-free solders which have been proposed in the past as being capable of preventing copper leaching are Sn-based alloys containing Cu, which is an element known to be effective for prevention of copper leaching. For example, an Sn-based lead-free solder comprising, by mass %, 5.5–8.0% of Cu, optionally 0.01–1.00% of Ag and 0.001–0.010% of Ni, and a remainder of Sn is described in JP P2001-121286A. This solder may further contain a minor amount of one or both of Ge and Au. Another Cu-containing, Sn-based lead-free solder is described in JP P2001-334384A. That solder comprises, by mass %, 0.01–0.5% of Ni, 2–5% of Cu, and optionally one or more of 0.01–3.5% of Ag, 0.01–5% of Sb, 0.01–9% of Zn, 0.01–3% of Bi, 0.01–0.5% of Ge, and 0.01–0.5% of P, and a remainder of Sn.

The element that is responsible for copper leaching is Sn, since copper leaching is caused by dissolving Cu in Sn. Therefore, with the above-described prior-art Sn-based lead-free solders, copper leaching generally occurs more markedly due to its higher Sn content compared to with a conventional Cu-containing Pb—Sn solder. Furthermore, since such Sn-based lead-free solders have a higher liquidus temperature so that the soldering temperature or the temperature of molten solder is also higher, copper leaching becomes still more severe. As a result, the effect of these prior-art Sn-based lead-free solders is not sufficient to achieve prevention of copper leaching at coil ends to a satisfactory degree, particularly when the coil is formed from a thin copper wire with a diameter of at most 100 μm.

SUMMARY OF THE INVENTION

The present invention provides a lead-free solder which has a very low tendency to cause copper leaching even when it is used to precoat coil ends of a thin copper wire or when such coil ends are dipped in molten solder.

It has been found that Co is extremely effective for preventing copper leaching when added to an Sn—Cu alloy and that addition of Ni to the resulting Sn—Cu—Co alloy has an effect of further diminishing copper leaching.

Thus, a lead-free solder according to one form of the present invention comprises 1.5–8 mass % of Cu, 0.01–2 mass % of Co, optionally 0.01–1 mass % of Ni, and a remainder of Sn and has a liquidus temperature of 420° C. or below.

The lead-free solder may further comprise at least one oxidation-inhibiting element and/or at least one wettability-improving element. The at least one oxidation-inhibiting element can be selected from the group consisting of P, Ge, and Ga, with the total amount of such elements being 0.001–0.5 mass %. The at least one wettability-improving element can be Ag in an amount of 0.05–2 mass %.

The present invention also provides a coil having an end which is coated with a lead-free solder according to the present invention.

DESCRIPTION OF PREFERRED EMBODIMENTS

A lead-free solder alloy according to the present invention is particularly suitable for use with a coil made of copper wire having insulating coats in order to thermally remove the insulating coats at the coil ends and simultaneously precoat the coil ends with the solder by dipping the coil ends in molten solder. The lead-free solder is also suitable for soldering the ends of a coil of copper wire to electric terminals. Such soldering may be performed by either dip soldering or iron soldering. Preferably the coil ends to be soldered are precoated with the solder. In this case, soldering may in some instances be performed with the precoated solder alone by heating the solder in a furnace or with a heating tool such as a soldering iron.

In order to thermally remove the insulating coats, which usually consist of an inner enamel coat and an outer polyurethane coat, from the ends of a coil, it is necessary to heat the coil ends to a temperature in the vicinity of 400° C. Thus, the solder should melt at that temperature to form molten solder in which the coil ends are dipped to thermally remove the insulating coats. However, if the temperature of the molten solder is higher than 470° C., the insulating coats on the coil ends dipped therein will immediately carbonize, and the resulting carbon will adhere to the coil ends, thereby preventing the solder from metallically bonding to the wire. A temperature higher than 470° C. is also disadvantageous in that copper leaching occurs to a great extent at such a high temperature.

Dip soldering using molten solder is normally carried out at a temperature in the range of from 20° C. to 50° C. higher than the liquidus temperature of the solder, depending on the heat capacity of the part to be soldered. Therefore, in order to make it possible to carry out dip soldering at a temperature of 470° C. or below, a solder according to the present invention has a liquidus temperature of 420° C. or below.

An Sn-based lead-free solder according to the present invention contains 1.5–8 mass % of Cu and 0.01–2 mass % of Co in order to prevent copper leaching when coil ends are dipped in molten solder. If the Cu content is less than 1.5 mass %, the effect of preventing copper leaching is not appreciable. Addition of Cu in an amount of more than 8 mass % causes the solder to have a liquidus temperature higher than 420° C., thereby causing severe copper leaching and adversely affecting solderability.

Addition of Co to an Sn—Cu solder is highly effective for further decreasing copper leaching of the Sn—Cu solder. This effect is not appreciable if the Co content is less than 0.01 mass %, while the effect saturates as the Co content increases to approximately 2 mass %. Addition of Co in excess of 2 mass % is also disadvantageous in that it increases the liquidus temperature of the solder significantly.

The Cu content is preferably 2–5 mass %, and the Co content is preferably 0.05–0.5 mass % and more preferably 0.05–0.2 mass %.

Ni may optionally be added to the solder according to the present invention in order to further improve the effect of Cu and Co on prevention of copper leaching. This effect is not appreciable if the Ni content is less than 0.01 mass %. Addition of more than 1 mass % of Ni increases the liquidus temperature of the solder to such an extent that it is higher than 420° C., which is not desirable as described above. Therefore, when Ni is added, it is preferable that the Ni content be 0.01–1 mass % and more preferably 0.1–0.3 mass %.

In order to remove the insulating coats at the ends of a coil of coated copper wire by dipping the ends in molten solder, the temperature of the molten solder is as high as approximately 400° C. or above (and preferably below 470° C. as described above). At such a high temperature, oxidation of the solder becomes significant, and a large amount of oxides are formed on the surface of the molten solder. In order to suppress the oxidation of the solder, it is possible to add one or more elements which have an effect of inhibiting the oxidation of molten solder. Examples of such elements are P, Ge, and Ga. When added, one or more of these oxidation-inhibiting elements is present in the solder in a total amount of 0.001–0.5 mass %. If the total amount of these oxidation-inhibiting elements is less than 0.001 mass %, the desired effect is not achieved appreciably. However, if the total amount of these elements is more than 0.5 mass %, they adversely affect solderability. Preferably, the total amount of the oxidation-inhibiting elements is 0.005–0.1 mass %.

When coil ends are dipped in molten solder, the molten solder must sufficiently wet the dipped copper wire of the coil from which the insulating coats have been removed. Lead-free Sn—Cu—Co and Sn—Cu—Co—Ni solders may not always exhibit sufficient wettability to completely wet the dipped copper wire. As a result, the entire portions of the wire which has been dipped in the molten solder may not be precoated with the solder. In order to avoid the occurrence of such an undesirable phenomenon, an element which has an effect of improving wettability may be added to the solder. An example of such a wettability-improving element is Ag. When added, Ag is preferably present in an amount of 0.05–2 mass % and more preferably 0.1–2 mass %. If the Ag content is less than 0.05 mass %, its wettability-improving effect is not developed appreciably. At an Ag content of approximately 2 mass %, the wettability-improving effect of Ag saturates, and Ag is also costly, so it is not preferable to add Ag in an unnecessarily large amount which exceeds 2 mass %.

The lead-free Sn—Cu—Co or Sn—Cu—Co—Ni solder according to the present invention may take any form, but normally it is in a form suitable for forming a molten solder, such as bar solder, preformed solder, or the like. When the solder is used for soldering of precoated coil ends to electric terminals by supplying the solder to the terminals, it can take the form of wire solder, flux-cored wire solder, or solder paste.

As described above, before coil ends of coated copper wire are dipped in molten solder, a soldering flux may be applied to the coil ends such that the flux can exert its effect on the wire immediately after the insulating coats have been removed from the wire in the molten solder. A rosin-based flux may be used for this purpose, although other fluxes can be used as long as they are effective at the temperature of the molten solder which is as high as 400° C. or above.

A lead-free solder according to the present invention effectively suppresses copper leaching in a molten state even though it has a composition based on Sn which readily dissolves Cu. Therefore, it is particularly suitable for use in a molten state to perform removal of insulating coats and precoating of coil ends by dipping the coil ends in molten solder, thereby minimizing or eliminating the possibility of a significant reduction in diameter of wire or complete disappearance of the wire even if the coil is made of a thin copper wire with a diameter of 100 μm or smaller. As a result, the reliability of a coil precoated with the solder is highly improved.

EXAMPLES

Solders having the compositions shown in Table 1 were prepared and tested for copper leaching speed and wettability in the following manner.

Copper Leaching Speed

Each solder was heated to 400° C. in a solder bath to achieve a molten state. A coil of coated copper wire which was covered with an inner enamel coat and an outer polyurethane coat was used as a testing material to be dipped. After a rosin flux was applied to an end of the coil along a predetermined length, the end of the coil was dipped in the molten solder at 400° C. for 10 seconds, 20 seconds, or 30 seconds. The diameter of the copper wire after each dipping period was measured to determine the speed of reduction of the wire diameter (μm per second) caused by copper leaching as the copper leaching speed.

Wettability

The wettability of each solder was tested by the wetting balance test by dipping a copper sheet having dimensions of 10 mm×30 mm×0.3 mm in molten solder at 400° C. The wettability was evaluated by the zero crossing time (wetting time) for the wetting curve obtained by the test.

The test results of each solder are also shown below in Table 1 along with the composition and the solidus and liquidus temperatures thereof.

TABLE 1

| Run No. | Composition (mass %) | | | | | | | M.T.[1] (° C.) | | Cu leaching speed (μm/sec) | Wettability[2] (sec) | Remarks[3] |
|---|---|---|---|---|---|---|---|---|---|---|---|---|
| | Sn | Cu | Co | Ni | P | Ge | Ga | Ag | S | L | | | |
| 1 | Bal.[4] | 2 | 0.01 | | | | | | 227 | 286 | 2.8 | 1.6 | Inventive |
| 2 | Bal. | 2 | 0.3 | 0.01 | | | | | 227 | 286 | 2.5 | 1.5 | Inventive |
| 3 | Bal. | 4 | 2 | 0.3 | | | | | 228 | 356 | 1.6 | 1.6 | Inventive |
| 4 | Bal. | 8 | 1 | 1 | | | | | 228 | 409 | 1.0 | 1.5 | Inventive |
| 5 | Bal. | 2 | 0.5 | | 0.02 | | | | 228 | 352 | 2.8 | 1.5 | Inventive |
| 6 | Bal. | 2 | 1 | 0.5 | | 0.05 | | | 228 | 356 | 2.4 | 1.5 | Inventive |
| 7 | Bal. | 4 | 0.5 | 0.2 | | | 0.3 | | 227 | 352 | 1.6 | 1.7 | Inventive |
| 8 | Bal. | 6 | 0.3 | 0.3 | 0.02 | 0.01 | 0.07 | | 227 | 380 | 1.5 | 2.1 | Inventive |
| 9 | Bal. | 2 | 0.2 | 0.2 | 0.01 | | 0.07 | 2 | 218 | 281 | 2.2 | 0.5 | Inventive |
| 10 | Bal. | 2 | 0.2 | 0.2 | 0.01 | | 0.07 | 0.3 | 217 | 282 | 2.5 | 0.9 | Inventive |
| 11 | Bal. | 0.7 | | | | | | | 227 | 229 | 5.5 | 1.8 | Compar. |
| 12 | Bal. | 2 | | | | | | | 227 | 286 | 5.2 | 1.8 | Compar. |
| 13 | Bal. | 4 | | | | | | | 227 | 347 | 3.2 | 1.8 | Compar. |
| 14 | Bal. | 4 | | 0.2 | | | | | 228 | 350 | 3.0 | 1.6 | Compar. |
| 15 | Bal. | 0.5 | | | | | | 3 | 217 | 219 | 5.3 | 0.5 | Compar. |

(Notes)
[1]Melting temperature: L = Liquidus temperature, S = Solidus temperature
[2]Zero crossing time (wetting time) in a wetting balance test
[3]Inventive = Solder of this invention; Compar. = Comparative solder
[4]Balance As can be seen from Table 1, a lead-free Sn—Cu based solder containing Co according to the present invention shows significantly suppressed copper leaching as demonstrated by the fact that it has a copper leaching speed which is significantly slower than that of the conventional or known Sn—Cu based solders. Thus, addition of a small amount of Co to an Sn—Cu solder is highly effective for suppressing copper leaching. It can also be seen from Table 1 that addition of Ag has an effect of improving wettability as demonstrated by a shorter wetting time.

What is claimed is:

1. A lead-free solder consisting of 1.5–8 mass % of Cu, 0.01–2 mass % of Co, 0.01–1 mass % of Ni, and a remainder of Sn and having a liquidus temperature of 420° C. or below.

2. A coil comprising a wire with an end which is precoated with a lead-free solder as claimed in claim 1.

3. A soldering method comprising soldering the precoated end of the coil as claimed in claim 2 to another member.

4. A method of treating a copper wire comprising dipping an end of a coated copper wire in molten solder comprising a solder as claimed in claim 1.

5. A lead-free solder as claimed in claim 1 containing 90 to 97.99 mass % of Sn.

6. A lead-free solder as claimed in claim 1 containing 93.7 to 97.99 mass % of Sn.

7. A lead-free solder as claimed in claim 1 containing 2–5 mass % of Cu.

8. A lead-free solder as claimed in claim 1 containing 0.05–0.5 mass % of Co.

9. A lead-free solder as claimed in claim 1 containing 0.05–0.2 mass % of Co.

10. A lead-free solder as claimed in claim 1 containing 0.1–0.3 mass % of Ni.

11. A lead-free solder as claimed in claim 1 containing 2–5 mass % of Cu, 0.05–0.5 mass % of Co, and 0.1–0.3 mass % of Ni.

* * * * *